Nov. 21, 1950     C. H. HARRIS     2,530,876
AUTOMOBILE TRAY
Filed April 23, 1946     2 Sheets-Sheet 1
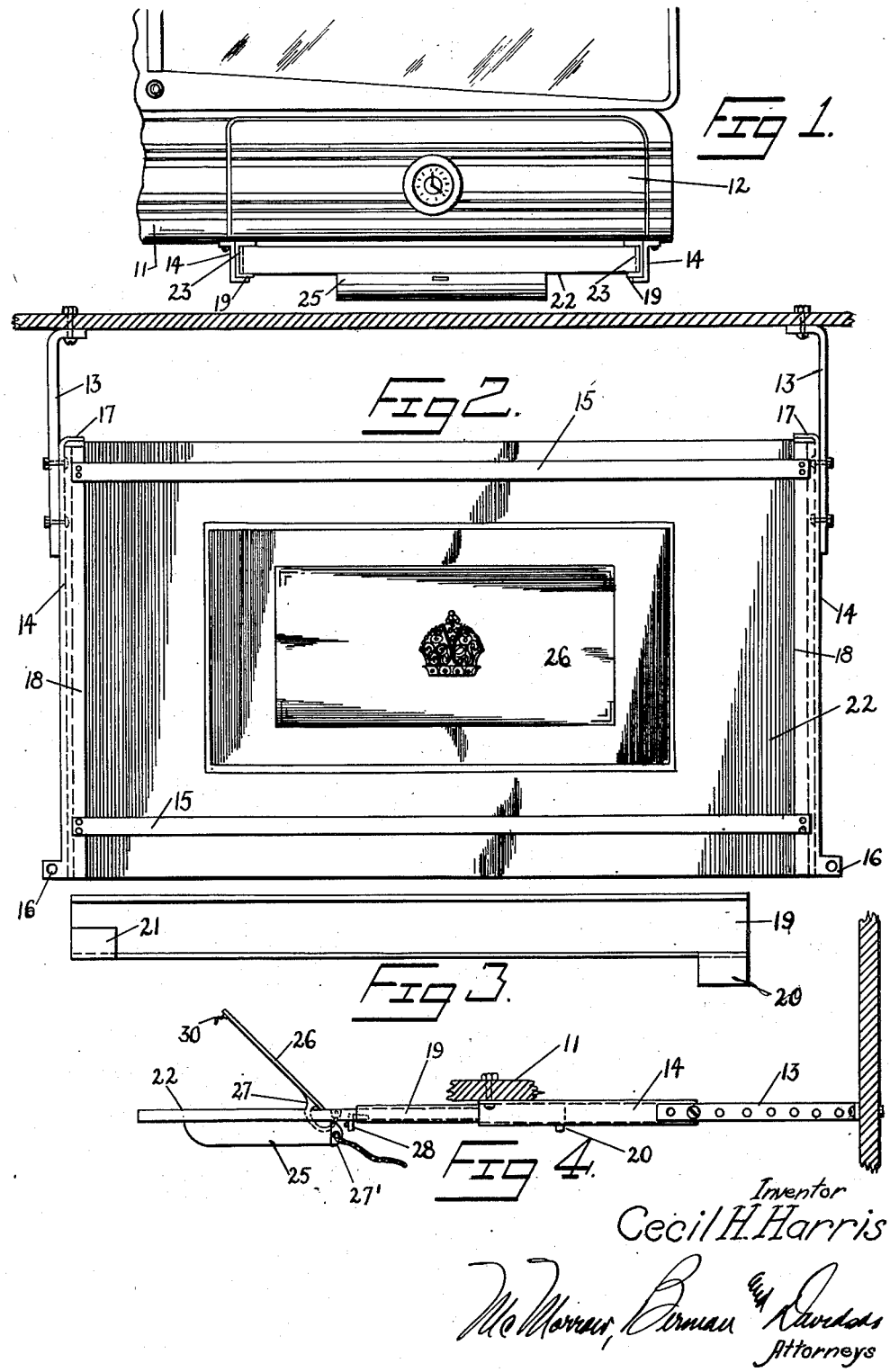
Inventor
Cecil H. Harris
Attorneys

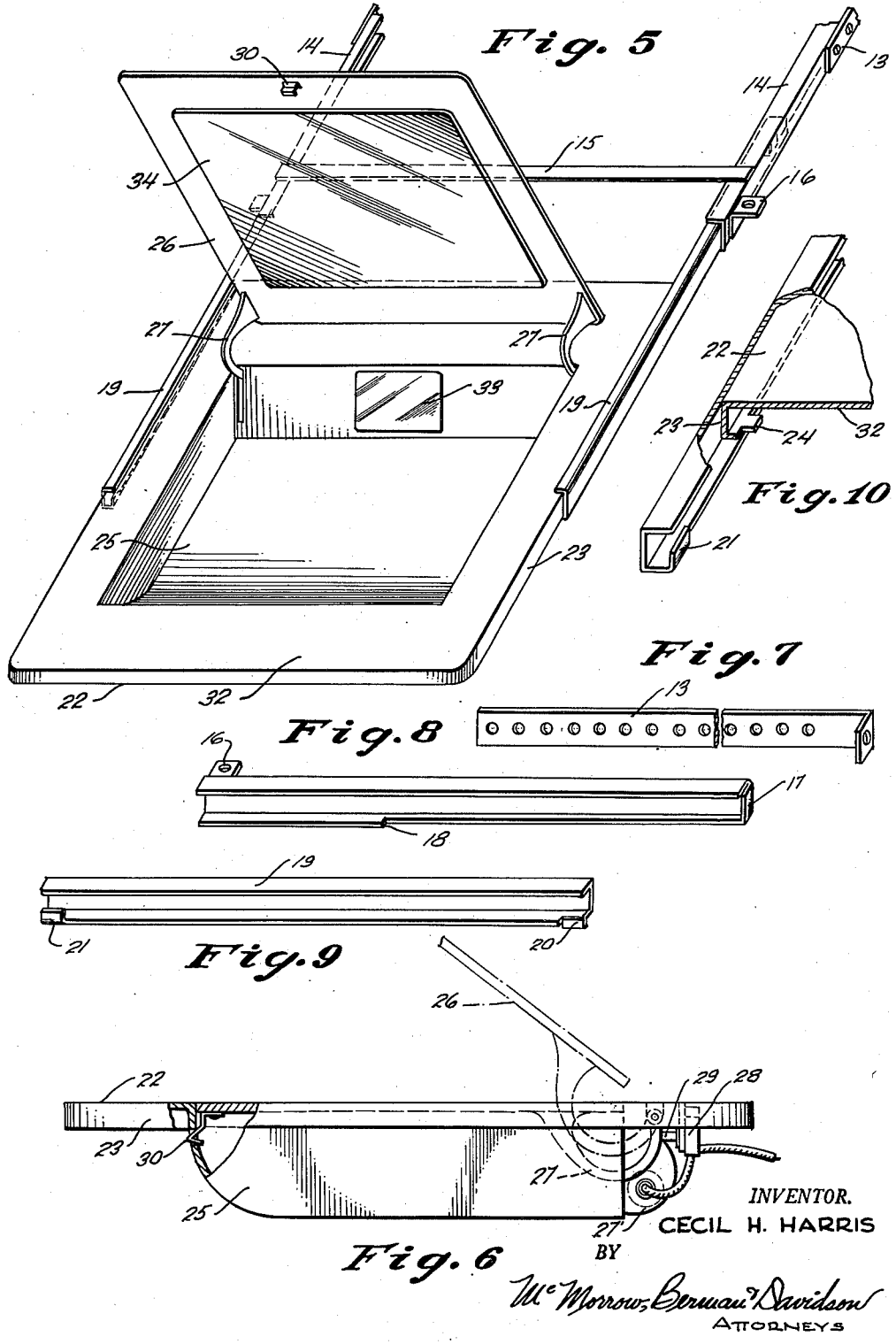

Patented Nov. 21, 1950

2,530,876

UNITED STATES PATENT OFFICE 2,530,876

AUTOMOBILE TRAY

Cecil H. Harris, Albertville, Ala.

Application April 23, 1946, Serial No. 664,305

1 Claim. (Cl. 206—19.5)

This invention relates to tray structures, and more particularly to a combined receptacle and tray adapted to be mounted on the interior of a motor vehicle.

A main object of the invention is to provide a novel and improved tray structure and supporting means therefor which is very simple in construction, easy to install and convenient to use.

A further object of the invention is to provide an improved automobile tray which is adapted to be positioned normally in an inconspicuous and non-obstructing position when not in use but which may be readily extended to operative position, said tray including a receptacle for various objects, the receptacle having various novel and useful features.

Further objects and advantages of the invention will become apparent from the following description and claim, and from the accompanying drawings, wherein:

Figure 1 is a front elevational view of a tray structure according to the present invention, shown installed under the glove compartment of an automobile dashboard.

Figure 2 is a top plan view of the tray structure of Figure 1, the tray being shown in retracted inoperative position.

Figure 3 is an elevational view of a secondary slide channel member employed in the tray structure of Figure 1.

Figure 4 is a side elevational view showing the tray structure of Figure 1 in extended operative position.

Figure 5 is a perspective view of the tray structure in open position.

Figure 6 is a side elevational view of the tray structure, a portion being broken away and shown in cross section to better illustrate the construction thereof.

Figure 7 is a perspective view of a tray supporting bracket member.

Figure 8 is a perspective view of a channel member slidably associated with the bracket member 13.

Figure 9 is a perspective view of another channel member slidably associated with the member illustrated in Figure 8.

Figure 10 is a perspective view of a fragmentary portion of the assembly, portions being broken away and shown in cross section to better illustrate the construction thereof.

Referring to the drawings, 11 designates the dashboard of a motor vehicle, said dashboard being provided with a conventional glove compartment 12. Secured to the wall of the passenger compartment of the vehicle under the glove compartment 12 are a pair of parallel longitudinally extending bracket members 13, 13. Secured to the ends of bracket members 13, 13 are a pair of opposed parallel channel members 14, 14 defining horizontal guideways. The top flanges of channel members 14, 14 are secured together by a pair of cross-bars 15, 15 which rigidify the guideway structure defined by said channel members. At the forward end of each channel member 14 a securing tab 16 is formed thereon for securing the channel members to the under side of dashboard 11. At the rearward end of each channel member 14 an inwardly bent tab 17 is provided forming stop means for limiting rearward movement of the tray structure carried by the channel members. The rearward portions of the bottom flanges of the channel members 14, 14 are partly cut away, to define stop shoulders 18. Slidably supported in said channel members 14, 14 are secondary opposed slide channels 19, 19 defining a secondary guideway. Each secondary slide channel 19 is formed at its rearward end with a depending tab element 20 cooperating with a shoulder 18 to limit forward movement of the secondary slide channel. Rearward movement of the secondary slide channels in stationary channels 14, 14 is limited by tab members 17, 17.

Formed at the forward end of each secondary slide channel 19 is an upwardly bent tab element 21. Slidably supported in the opposed secondary slide channels is a rectangular tray member 22 of sheet metal, or the like, having a top wall 32 and depending side flanges 23, 23 which are slidably received in the respective secondary slide channels 19, 19. Respective tabs 24 extend inwardly of the side flanges 23 intermediate the length thereof to cooperate with tab elements 21 and thus provide a stop for forward movement of the tray relative to the secondary slide channels 19 and the rear ends of these secondary slide channels may be closed to provide stops for rearward movement of the tray relative thereto.

Tray member 22 carries at its intermediate portion a downwardly-extending felt lined, rectangular receptacle 25 formed in the top wall 32. A closure member 26 is secured at one edge to top wall 32 at one side of the receptacle 25 by concealed, curved hinges 27 and is substantially flush with the top surface of the top wall of the tray when in closed position. Curved hinges 27 extend through respective openings in the rear wall of receptacle 25 and are pivotally secured to the top wall 32 of tray member 22. Receptacle 25 carries a housing 27' on its rear wall in which receptacle an illuminating device is mounted. Operation of this device is controlled by a switch 28 mounted under the rearward portion of tray member 22. Switch 28 is provided with a control button 29 which is engaged by one of the hinges 27 when closure members 26 is raised to open receptacle 25. Switch 28 remains open when closure member 26 is in closed position. When the closure member is opened, switch button 29 is released and switch 28 is closed, thereby illuminating the interior of compartment 25 through window 33.

Normally the tray is housed underneath glove compartment 12 and is in an inconspicuous and non-obstructing position. To use the tray device, tray member 22 is pulled out to fully extended position, as shown in Figure 5. When closure member 26 is opened to remove articles from receptacle 25 the interior of the receptacle is automatically illuminated.

The bottom surface of closure member 26 is preferably provided with a vanity mirror 34 so that it may be utilized by a passenger for the application of cosmetics, or the like. Illumination for this purpose is conveniently obtained from the illuminating device in the rear wall of receptacle 25. The illuminating device is arranged to light the compartment and at the same time to illuminate the face of any one sitting directly in front of the mirror. The hinge brackets 27 are of suitable length and curvature and the closure member carrying the mirror is arranged to stop in the correct position when open for normal use of the mirror by a passenger sitting comfortably in front of the tray device.

Closure member 26 is provided with a releasable spring latch 30 connected to the under side thereof adjacent its front edge. Spring latch 30 cooperates with a suitable detent element provided in the upper portion of the forward wall of receptacle 25. Latch 30 is of the automatic snap type, latching automatically when closure member 26 is closed.

The tray structure herein disclosed obviously has many uses such as for example, dining, drinking, writing, for ladies' cosmetic application, and the like. Compartment 25 may be equipped with different items used in ladies' make-up kits, or, for use as an automobile bar, compartment 25 may contain small drinking glasses, bottles and the like. With closure member 26 in closed position, the tray may be employed as a writing desk, dining table, or typewriting table.

The double slide feature allows the entire unit to be telescoped to occupy a minimum amount of space, giving a wide range for mounting on any standard model automobile. Brackets 13, 13 have a plurality of bolt holes permitting a wide range of adjustability for different models of automobiles. The slides are preferably lined with suitable rattle-preventing material.

While a specific embodiment of an automobile tray device has been disclosed in the foregoing description, it will be understood that various modifications within the spirit of the invention may occur to those skilled in the art. Therefore, it is intended that no limitations be placed on the invention other than as defined by the scope of the appended claim.

What is claimed is:

A tray assembly adapted to be mounted beneath the dashboard of an automobile and including a tray supported for sliding movement between a retracted position in which it is disposed substantially ahead of the dashboard and an extended position in which it is disposed rearwardly of the dashboard and in the front passenger compartment of the automobile, said tray assembly comprising a pair of substantially parallel channel members having apertured tabs at their forward ends for attachment to an automobile dashboard and lower flanges cut away to provide stop shoulders intermediate the length thereof, a pair of adjustable brackets secured to the rear ends of said channel members for attachment to automobile structure ahead of the dashboard, cross bars extending between and secured to said channel members, a pair of secondary slide channels slidably received one in each channel member and each having a tab on its rearward end cooperating with the stop shoulder of the corresponding channel member to limit forward movement of said secondary slide channels relative to said channel members, said channel members having closed rear ends limiting rearward movement of said secondary slide channels relative thereto, a rectangular tray slidable in said secondary slide channels and having a top wall including a receptacle, depending side flanges provided at their lower edges with inwardly-extending tabs, and front and rear depending flanges, respective tab elements on the forward ends of said secondary slide channels cooperating with said tray flange tabs to provide a stop for forward movement of said tray relative to said secondary slide channels, and a closure for said receptacle hinged to said top wall to lie substantially flush therewith when closed.

CECIL H. HARRIS.

REFERENCES CITED

The following references are of record in the file of this patent:

UNITED STATES PATENTS

| Number | Name | Date |
| --- | --- | --- |
| 1,139,188 | Kane | May 11, 1915 |
| 1,339,842 | Bergmann | May 11, 1920 |
| 1,993,950 | Wharam | Mar. 12, 1935 |
| 2,004,025 | Van Voorst | June 4, 1935 |
| 2,111,434 | Morrison | Mar. 15, 1938 |
| 2,119,267 | Coleman | May 31, 1938 |
| 2,270,557 | Randall | Jan. 20, 1942 |
| 2,352,493 | Palmer | June 27, 1944 |
| 2,353,391 | Cotton | July 11, 1944 |